US012583010B2

(12) United States Patent
Zahr

(10) Patent No.: US 12,583,010 B2
(45) Date of Patent: Mar. 24, 2026

(54) MATERIAL DISPENSING SYSTEM

(71) Applicant: UNIQUE SOLUTIONS R.A.I LTD, Hadera (IL)

(72) Inventor: Wadeeh Zahr, Isafiya (IL)

(73) Assignee: UNIQUE SOLUTIONS R.A.I LTD, Hadera (IL)

(*) Notice: Subject to any disclaimer, the term of this patent is extended or adjusted under 35 U.S.C. 154(b) by 148 days.

(21) Appl. No.: 18/402,106

(22) Filed: Jan. 2, 2024

(65) Prior Publication Data

US 2025/0214103 A1 Jul. 3, 2025

(51) Int. Cl.
*B05C 17/01* (2006.01)
*B05C 17/005* (2006.01)

(52) U.S. Cl.
CPC .... *B05C 17/0106* (2013.01); *B05C 17/00596* (2013.01); *B05C 17/0103* (2013.01)

(58) Field of Classification Search
CPC .......... B05C 17/0106; B05C 17/00596; B05C 17/0103; B05C 17/01; B05C 17/0116; B05C 17/012; B05C 17/0123
USPC .................. 222/80, 325–327, 340, 386, 391
See application file for complete search history.

(56) References Cited

U.S. PATENT DOCUMENTS 6,640,998 B1 * 11/2003 Kern .................. B05C 17/0126 222/391
9,205,451 B2 12/2015 Zahr
2002/0108971 A1 * 8/2002 Lafond ................ G01F 11/022 222/333
2008/0006654 A1 * 1/2008 Lampe ................ B05C 17/0106 222/386

* cited by examiner

*Primary Examiner* — David J Walczak
(74) *Attorney, Agent, or Firm* — William H. Dippert; Laurence A. Greenberg; Werner H. Stemer

(57) ABSTRACT

A device for dispensing viscous material out of a container having a nozzle, and a movable cap comprises a housing to accommodate the container, and a cutting-pushing element that comprises a push plate, a blade having a sharp edge, and a base having a recess. A force transmitting trigger is coupled to the recess to force the cutting-pushing element to move forward and backward. The device further comprises an improvement that comprises a stabilizer positioned between the blade and the push plate to assist in a stable backward movement of the container within the housing.

15 Claims, 5 Drawing Sheets

MATERIAL DISPENSING SYSTEM

FIELD OF THE INVENTION

The present invention relates to construction utensils. In particular, the invention relates to improved hand-held material dispensing devices.

BACKGROUND OF THE INVENTION

Caulk guns are known in the art of construction and are adapted for sealing crevasses or adhering surfaces to each other. Viscous substances such as silicon glue are typically applied through utensils such as a caulk gun, which enable pushing the substance out of the container in which it is stored in order to apply it onto a surface or to fill in the crevasses.

Conventional hand-held material dispensing devices rely on the action of a piston to push paste-like materials out of a tube's nozzle. The movement of the piston may be induced by employing mechanical means such as a trigger or a spring; Typically, a rod is used to push forward the moveable cap of standard containers, but there are also unique devices that use a push and cut piston that makes the long rod redundant.

A push and cut device is described in U.S. Pat. No. 9,205,451. However, the tube that should proceed within the device and be cut can be slippery. Improvement of the tube's movement is needed.

SUMMARY OF THE INVENTION

According to a first aspect of the present disclosed subject matter, a device for dispensing viscous material out of a container is provided. The container comprises a nozzle and a movable cap, the viscous material being disposed therebetween, the device comprises:

- a housing configured to accommodate the container provided with material to be dispensed;
- a cutting-pushing element provided within the housing, the cutting-pushing element comprising:
  - a push plate;
  - a blade having a sharp edge, and
  - a base having a recess;
  - a force transmitting trigger coupled to said recess in the base so as to force the cutting-pushing element to move forward and backward wherein forcing a movement of the force transmitting trigger inserts the push plate into said container while moving the movable cap so as to outwardly push the viscous material through the nozzle and to force the blade to lengthwise cut the container, while releasing the force transmitting trigger allows the cutting-pushing element and the container to move backwards, and
  - a stabilizer positioned between the blade and the push plate to assist in a stable backward movement of the container within the housing.

In accordance with another embodiment of the present subject matter, said stabilizer has a fork-like shape.

In accordance with another embodiment of the present subject matter, said stabilizer is placed in a position in which the blade is between sides of the fork-like shape.

In accordance with another embodiment of the present subject matter, the blade is provided with an adjunct and wherein the blade and the adjunct are mounted on the base.

In accordance with another embodiment of the present subject matter, the force transmitting trigger is provided with a protrusion that is configured to associate with the recess.

In accordance with another embodiment of the present subject matter, the sharp edge of the blade is straight.

In accordance with another embodiment of the present subject matter, the sharp edge of the blade is rounded.

In accordance with another embodiment of the present subject matter, the blade has a ring-like structure.

In accordance with another embodiment of the present subject matter, the ring-like structure is supported on an adjunct.

In accordance with another embodiment of the present subject matter, said adjunct is provided with a coarse surface adjacent to the base and configured to assist in stabilizing the container during movements of the container within the housing.

In accordance with another embodiment of the present subject matter, said adjunct is provided with a line of protrusions that forms a coarse surface configured to assist in stabilizing the container during its movements within the housing.

In accordance with another embodiment of the present subject matter, the force transmitting trigger is electrically operated and controlled.

According to a second aspect of the present disclosed subject matter, an improvement to a device for dispensing viscous material having a housing configured to accommodate a container having a nozzle, the container provided with material to be dispensed, a cutting-pushing element provided within the housing, the cutting-pushing element comprises a push plate, a blade having a sharp edge, and a base having a recess, and a force transmitting trigger coupled to the recess in the base so as to force the cutting-pushing element to move forward and backward, the improvement comprising a stabilizer positioned between the blade and the push plate to assist in a stable backward movement of the container within the housing.

In accordance with another embodiment of the present subject matter, the stabilizer is shaped as a fork and wherein sharp edge of the blade is between the two sides of the fork-like structure.

In accordance with another embodiment of the present subject matter, the improvement further comprising providing a coarse surface on an adjunct to the blade, wherein the coarse surface is adjacent to the base so as to assist in stabilizing the container during its movements within the housing.

In accordance with another embodiment of the present subject matter, the blade is of a ring-like structure so it can partially act also as the stabilizer.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION OF THE INVENTION

Figure 1:
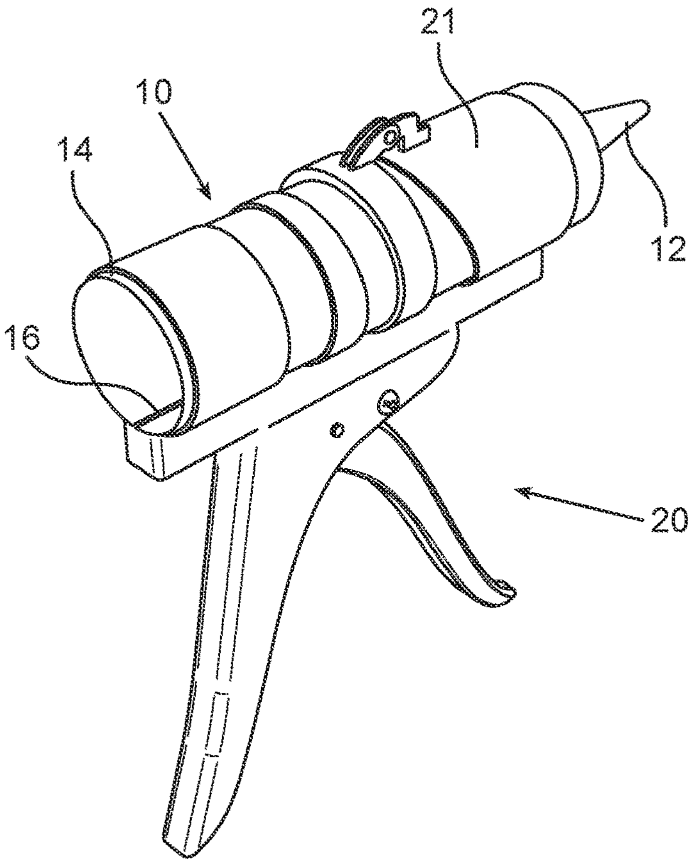
FIG. 1 (PRIOR ART)
FIG. 1 illustrates a standard tubular container mounted onto a paste dispensing device in accordance with the prior art.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms “comprises”, “comprising”, “includes”, “including”, and “having” together with their conjugates mean “including but not limited to”. The term “consisting of” has the same meaning as “including and limited to”.

The term “consisting essentially of” means that the composition, method or structure may include additional ingredients, steps and/or parts, but only if the additional ingredients, steps and/or parts do not materially alter the basic and novel characteristics of the claimed composition, method or structure.

As used herein, the singular form “a”, “an” and “the” include plural references unless the context clearly dictates otherwise. For example, the term “a compound” or “at least one compound” may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

It is an aspect of the present subject matter to provide an improved paste dispensing device. The device for dispensing viscous material out of a container, wherein the container comprising a nozzle and a movable cap and the viscous material being disposed therebetween, the device comprises a housing configured to accommodate the container provided with material to be dispensed and a cutting-pushing element that is provided within the housing. The cutting-pushing element comprises:

a push plate;

a blade having a sharp edge, and a base having a recess.

The device further comprises a force transmitting trigger coupled to said recess in the base so as to force the cutting-pushing element to move forward and backward wherein forcing a movement of the force transmitting trigger inserts the push plate into said container while moving the movable cap so as to outwardly push the viscous material through the nozzle and to force the blade to lengthwise cut the container, while releasing the force transmitting trigger allows the cutting-pushing element and the container to move backwards, and stabilizer positioned between the blade and the push plate to assist in a stable backward movement of the container within the housing.

The stabilizer is a significant improvement to the device.

Reference is now made to FIG. 1 illustrating a standard tubular container mounted onto a paste dispensing device in accordance with the prior art.

Paste dispensing devices such as glue guns, dispensing guns for sealants or any other material that are used to withdraw the material from a container are known in the art. A standard container 10 typically has a nozzle 12 having an aperture at the front side from which the material from within the container is dispensed and a rear side 14 having a moveable cap (not seen in the figure). When the container is full the moveable cap is located at the back end of the container 10, at its rear side 14. Force exerted upon the container’s movable cap causes the cap to move forward within the container 10, compressing and squeezing the material towards the nozzle 12 and out of the container. The container is emptied of material from the rear side of the container and to the front side, where the nozzle is positioned. The material is pushed using the paste dispensing device 20 having a housing 21 in which container 10 is placed, using a pushing element (not shown in this figure) that pushes the cap and the material forward towards the nozzle 12 that is incorporated with a blade (not shown in this figure) that cuts the container 10 while moving. The cutting-pushing element cannot be seen in this figure since it is positioned within container 10. A cut 16 is seen in the rear end of container 10. Dispensing device 20 is disclosed in U.S. Pat. No. 9,205,451.

Figure 2:
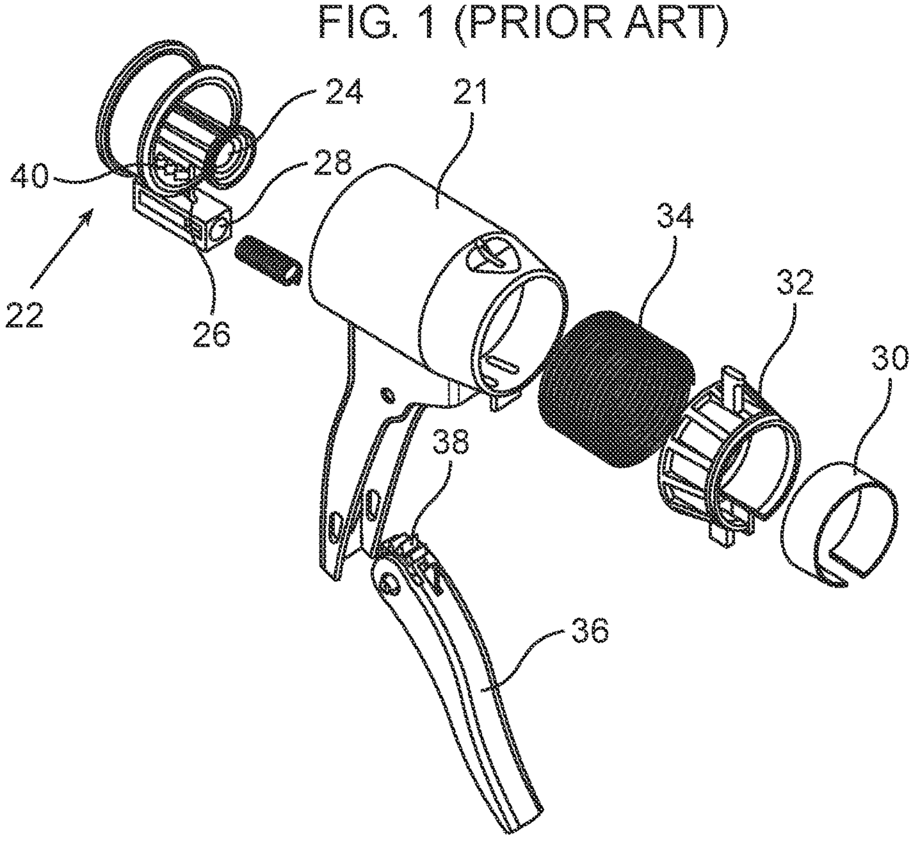
FIG. 2 (PRIOR ART)
FIG. 2 illustrates an exploded view of the paste dispensing device shown in FIG. 1.

Reference is now made to FIG. 2 illustrating an exploded view of the paste dispensing device shown in FIG. 1.

Since this is a prior art device that is already disclosed, only essential parts are explained herein. In the exploded view of the dispensing device 20, a cutting-pushing element 22 can be clearly seen to comprise a push plate 24 and a blade 26 wherein blade 26 is positioned behind push plate 24 and is configured to follow the push plate as the cutting-pushing element 22 is moved forward and cut the container 10 (seen in FIG. 1).

The push plate 24 and the blade 26 having a sharp edge are assembled on a cutting-pushing base 28. The push plate 24 can be of various shapes and sizes, enabling it to be inserted into containers having cross sections that are of different shapes. Blade 26 is provided for cutting the container's wall.

As seen already in FIG. 1, the cut 16 formed in container 10 enables further forward insertion of the push plate 24 into the container 10, thus extruding material out of the container 10.

A flexible friction element 30 fits inside a flexible stopper 32, that is placed in the front of the housing 21. A spring 34 is placed behind the stopper 32 and acts against stopper 32 to push it forward, toward the nozzle (when a container is properly mounted on the housing 21).

A trigger 36 is provided to the housing 21. The trigger 36 has cogs 38 that engage matching cogs 40 on the cutting-pushing element 22. When trigger 36 is squeezed, the cutting-pushing element 22 moves forwards in housing 21.

As mentioned herein before, one of the problems of such dispensing devices is possible free movement of the container within the housing.

Figure 3:
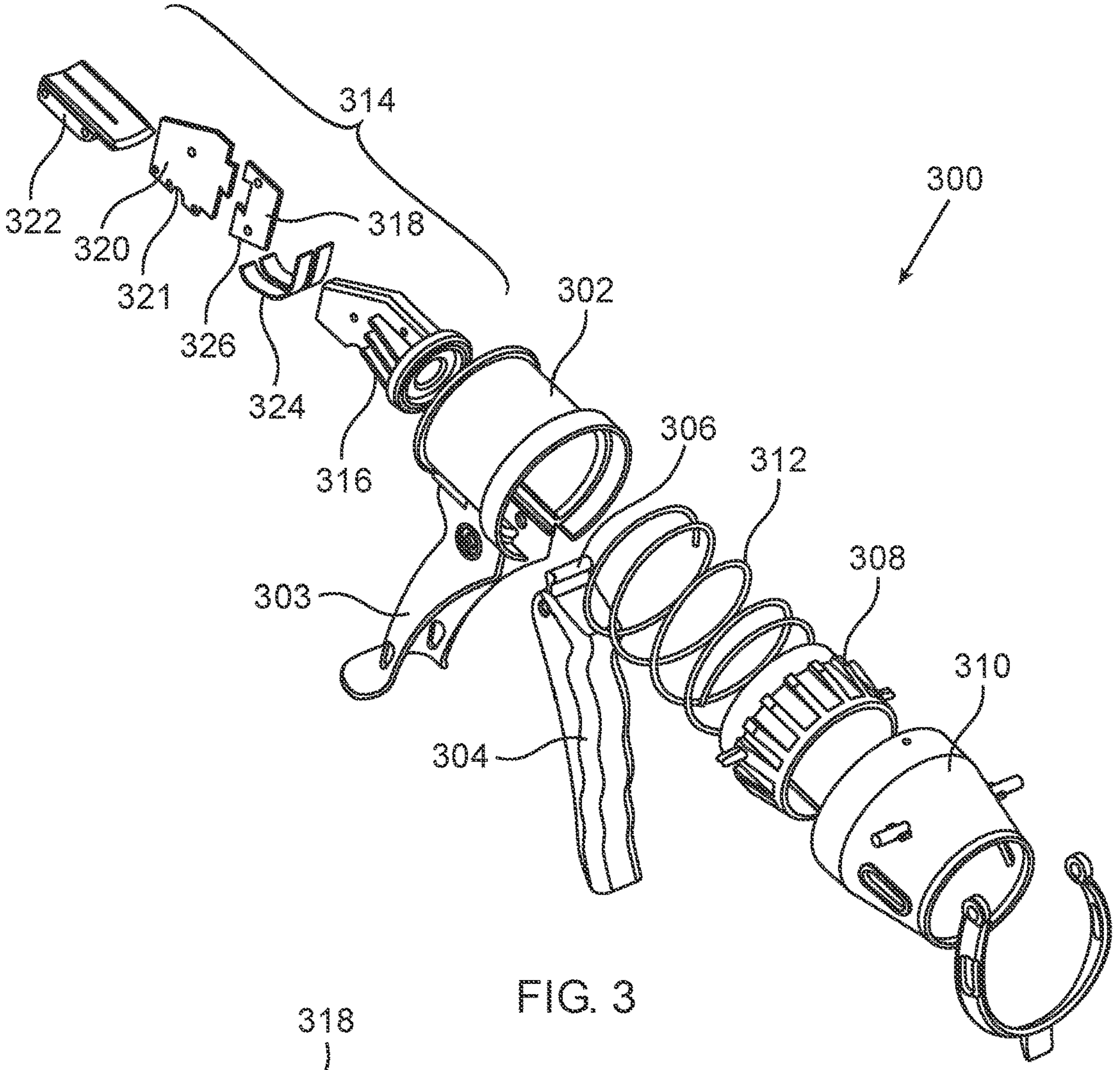
FIG. 3 illustrates an exploded view of a paste dispensing device, in accordance with some exemplary embodiments of the disclosed subject matter.

Reference is now made to FIG. 3 illustrating an exploded view of a paste dispensing device, in accordance with some exemplary embodiments of the disclosed subject matter.

The paste dispensing device 300 comprises three main parts-a housing 302, a frontal stopper 308, and a pushing-cutting element 314 positioned at the back.

Housing 302 is provided with a force transmitting trigger 304 having a bulge 306 that is protruding, when assembled, to within the inner side of the housing 302.

At the frontal portion of the paste dispensing device 300, a stopper 308 is provided that fits a cover 310 that is placed adjacent to the housing 302, when assembled. A spring 312 is positioned between the stopper 308 and the housing 302 wherein the spring 312 urges the stopper 308 to be pushed forward. The forward movement is confined by the cover 310 that is in a shape of a cone.

At the back side of the paste dispensing device 300, on the other side of the housing 302, a pushing-cutting element 314 is assembled. The pushing-cutting element 314 comprises a push plate 316 at the front that is configured to push the cap of the glue container forward and dispense the material from within the container (not shown in the figure). The pushing-cutting element 314 also comprises a blade 318 and an adjunct 320 placed behind the push plate 316, wherein the blade 318 cuts lengthwise the container's wall, in the direction towards the nozzle, while the pushing-cutting element 314 is pressed forward. The container, on the other hand, is held substantially in place during the forward pushing action of the pushing-cutting element 314 within the container by the stopper 308. Adjunct 320 is provided with a bottom recess 321 configured to receive the bulge 306 of the trigger 304 to allow the forward movement to occur when the trigger is moved towards a handle 303 of the housing 302.

The blade 318 and the adjunct 320 are placed on a base 322. A stabilizer 324, shaped as a fork, is positioned between the blade 318 and the plate 316 so that the blade cutting edge [316] 326, that is straight, is between the two sides of the fork-like stabilizer 324. The stabilizer 324 is configured to hold the container (shown in the prior art figures) so that when the pressure enforced on the container by the plate that pushes the material forward is released, the container is stably moving backwards. Bearing in mind that the container and the material inside it that should be dispersed are experiencing conflicting forces, it is of extreme importance to maintain the grasp of the housing 302 and the pushing-cutting element 314 in the device. This ensures a smooth and easy operation.

Figure 4:
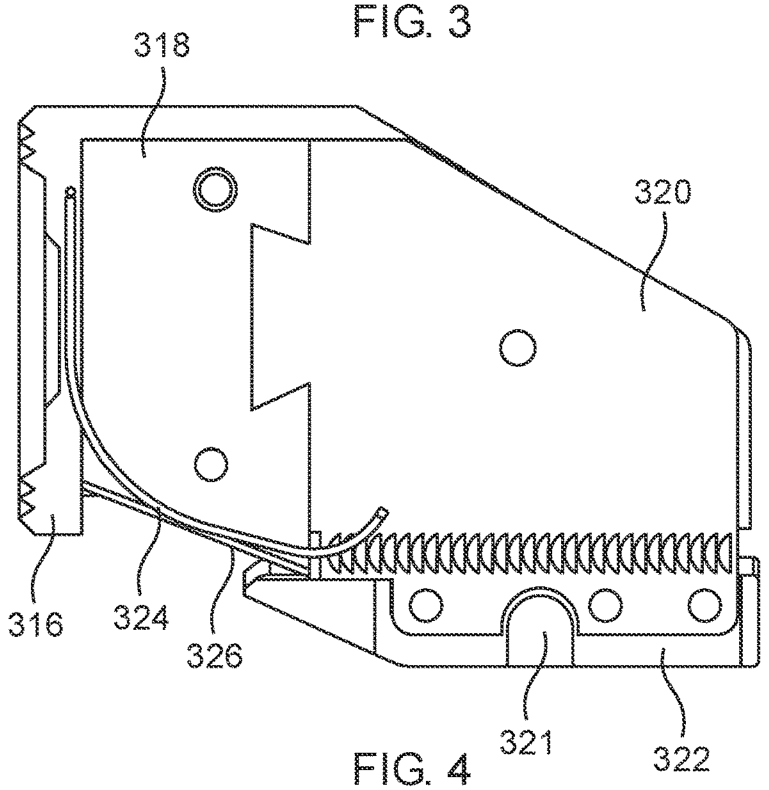
FIG. 4 illustrates a side view of a cutting-pushing element of a paste dispensing device, in accordance with some exemplary embodiments of the disclosed subject matter.

Reference is now made to FIG. 4 illustrating a side view of a cutting-pushing element of a paste dispensing device, in accordance with some exemplary embodiments of the disclosed subject matter.

The parts of pushing-cutting element 314 are shown when assembled. The stabilizer 324 is shown to be positioned between the plate 316 that pushes the material forward within the container and the blade 318 that follows the plate and cuts the container in an area from which the material was pushed. Those two actions, which are controlled by the trigger 304, impose different stresses on the container and the stabilizer 324 is configured to hold the container in place so as to assure effective operation.

Figure 5:
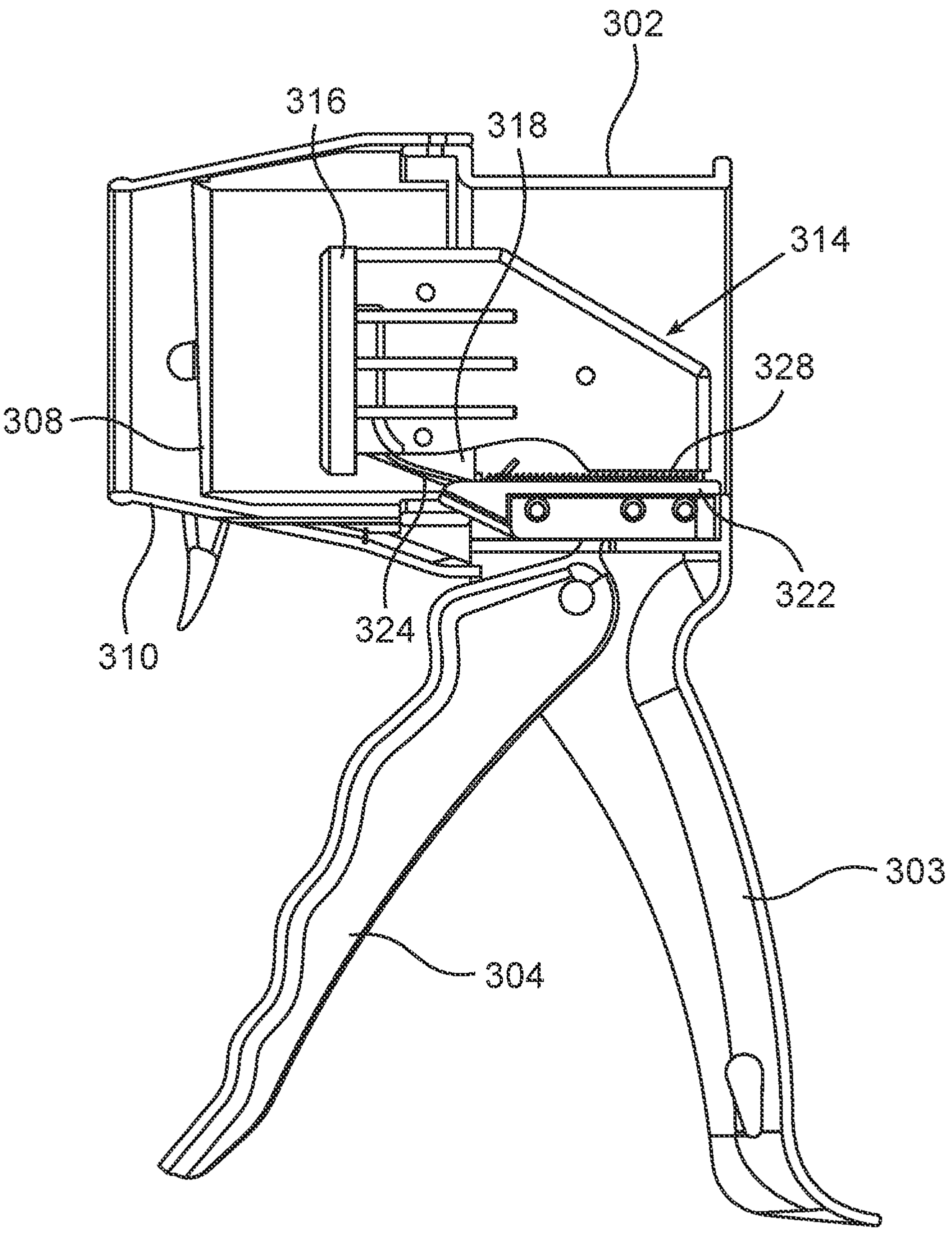
FIG. 5 illustrates a side view of the cutting-pushing element shown in FIG. 4 assembled within a paste dispensing device, in accordance with some exemplary embodiments of the disclosed subject matter.

Reference is now made to FIG. 5 illustrating a side view of the cutting-pushing element shown in FIG. 4 assembled within a paste dispensing device, in accordance with some exemplary embodiments of the disclosed subject matter.

In the sectional side view shown in FIG. 5, it can be observed that the pushing-cutting element as well as the frontal stopper 308 are placed within the housing 302 and the cover 310 that can be held by handle 303. The handle 303 act as a support to the trigger 304 that while pushed to be adjacent to the handle 303, pushes the pushing-cutting element 314 forward relative to the housing. When the trigger is released, the pushing-cutting element 314 is pulled back. The blade 318, when moving forward behind the plate 316, is engaged with the walls of the container that is positioned within the housing 302 and cuts the wall so the container can continue and move within the housing while the plate pushes some of the material forward each time the trigger 304 is pulled towards the handle 303.

The stabilizer 324 is shown to be between the between the blade 318 and the plate 316 so that the blade 318 is placed between the two forks of the fork-like structure while its bottom surface is holding the container, when inserted, down to the base 322 to stabilize the container in place. According to another embodiment, the base 322 on which the pushing-cutting element 314 is placed has a coarse surface 328, also assisting in the stabilizing of the container during the movements.

The part of the container extending out of the front of the housing 302 and the cover 310 becomes shorter during operation while the trigger 304 is being pulled towards the handle 303.

Figure 6:
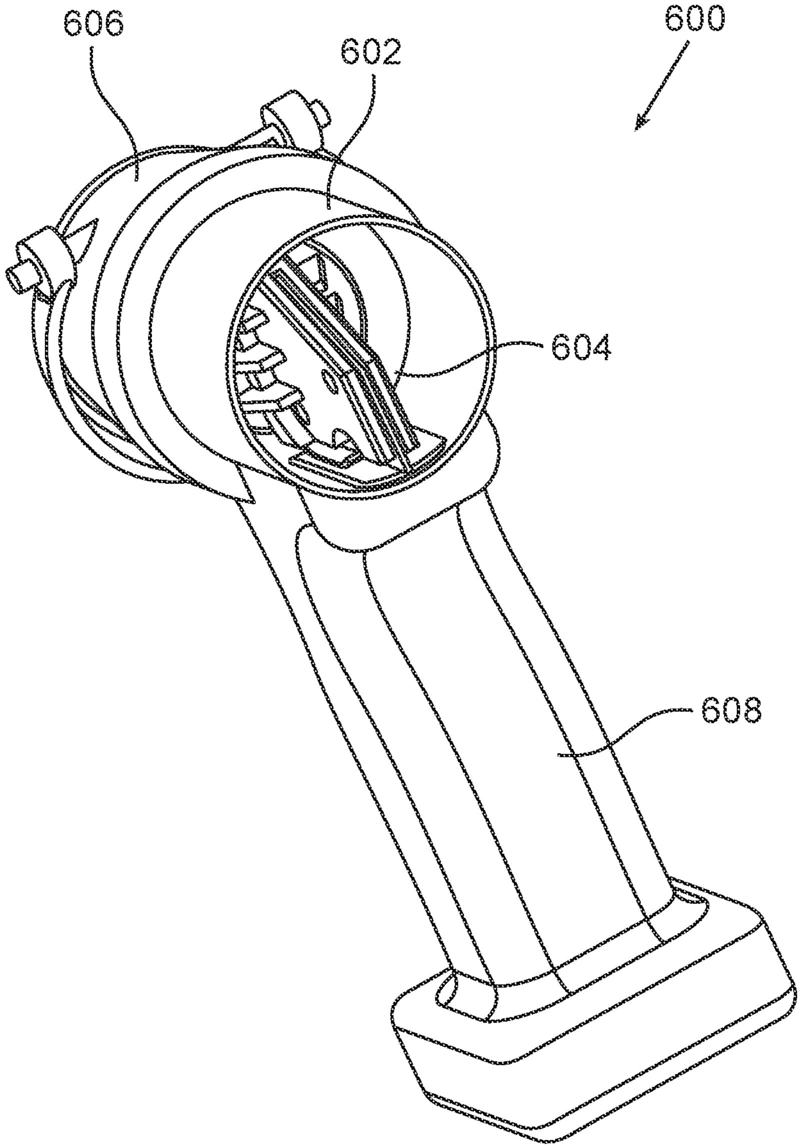
FIG. 6 illustrates a back isometric view of an assembled paste dispensing device, in accordance with some exemplary embodiments of the disclosed subject matter.

Reference is now made to FIG. 6 illustrating a back isometric view of an assembled paste dispensing device, in accordance with some exemplary embodiments of the disclosed subject matter.

The paste dispensing device 600 is provided with housing 602 in which a pushing-cutting element 604 is installed. The frontal side of the device is provided with a cover 606. The device 600 operates in a similar manner of the device 300 shown herein before. However, this device is electrically operated. The handle 608 is provided with a power source preferably inside the handle that electrically operates an element that is parallel to the bulge of the trigger in FIGS. 3 and 4 and functions the same.

Figure 7A:
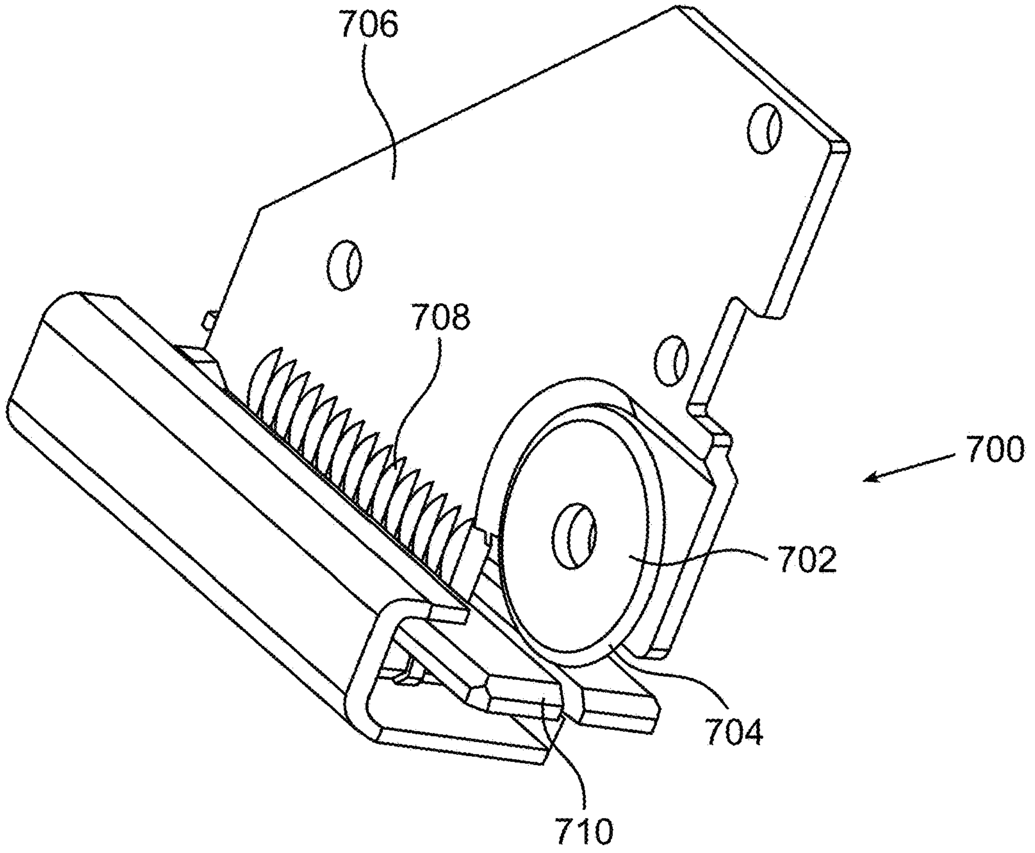
FIG. 7A illustrates a blade assembly to be incorporated within a cutting-pushing element, in accordance with some exemplary embodiments of the disclosed subject matter.
Figure 7B:
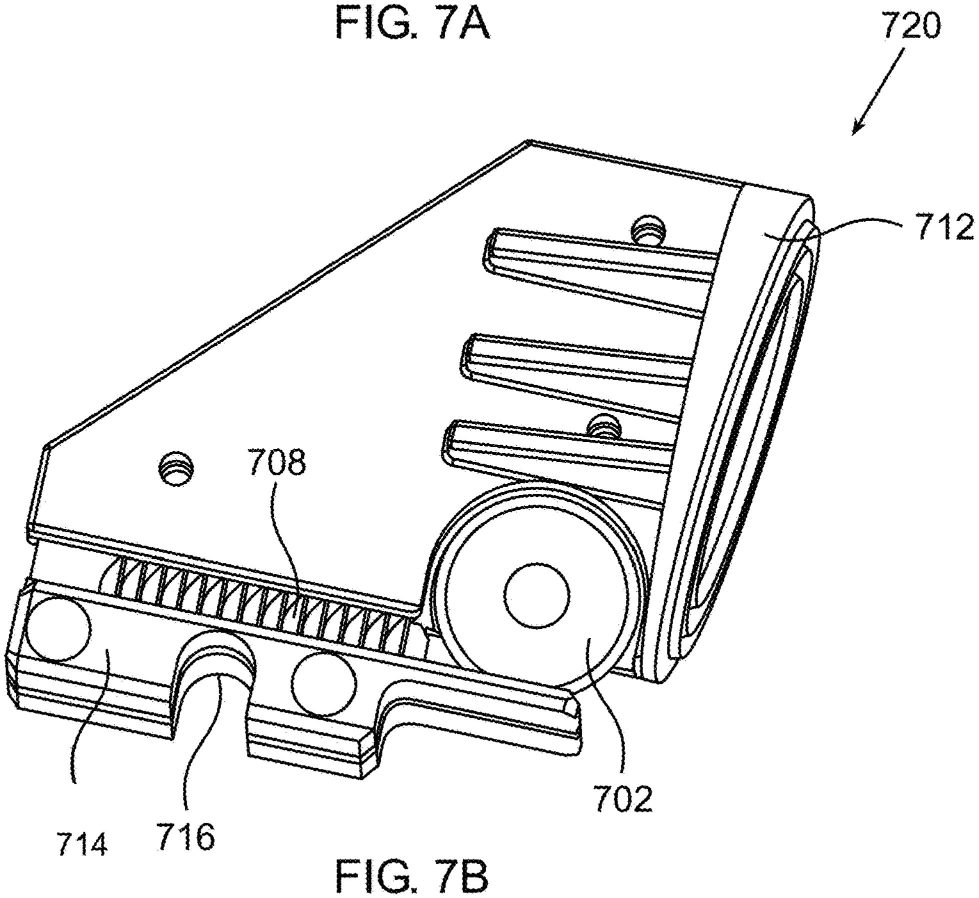
FIG. 7B illustrates the blade assembly shown in FIG. 7A incorporated within a cutting-pushing element, in accordance with some exemplary embodiments of the disclosed subject matter.

Reference is now made to FIGS. 7A and 7B illustrating a blade assembly to be incorporated within a cutting-pushing element and the cutting-pushing element incorporated with the blade assembly, in accordance with some exemplary embodiments of the disclosed subject matter.

The blade assembly 700 comprises a ring-shaped blade 702 having sharp edges 704 that are configured to cut the container (not shown in the figure). The ring-shaped blade 702 is supported by an adjunct 706 that supports the blade 702. The adjunct 706 is provided with a line of protrusions 708 that form a coarse surface that is configured to assist in stabilizing the container during its movements within the housing (the housing is not shown in this figure).

Stabilizer 710 in a fork-like structure is provided beneath the ring-like blade 702 wherein the blade is mounted on the gap between the two parts of the stabilizer 710.

The blade 702 and the adjunct 706 are placed adjacent to a push plate 712 and both are supported on a base 714 having a recess 716 into which a protrusion of a force transmitting trigger is inserted in order to move forward and backward the cutting-pushing element 720.

It should be noted that a viscous material dispensing device can be used in a variety of fields, not limited to construction. For example, a small embodiment of the viscous material dispensing device may be used in dental procedures when material needs to be dispensed into a patient's mouth. The mouth is a confined space, and reduction of the size of the utensil used to apply viscous material into a patient's mouth may be very useful.

In embodiments used in medical and dental procedures, the size of the container may be very small. Embodiments of the compact viscous material dispensing device for medical and dental use may be used to replace other viscous material application utensils requiring a push piston such as syringes. In the medical and dental embodiments, the hand-operated trigger may be small and designed to be operable with a finger. Optionally, the force transmission mechanism could be powered and the trigger may be operable by a push of a button.

Other embodiments of the compact viscous material dispensing device may be used in cooking and baking, for example for insertion of material such as melted chocolate into dessert cups.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A device for dispensing viscous material out of a container, the container comprising a nozzle and a movable cap, the viscous material being disposed therebetween, the device comprising:

- a housing configured to accommodate the container provided with material to be dispensed;
- a cutting-pushing element provided within the housing, the cutting-pushing element comprising:
  - a push plate;
  - a blade having a sharp edge, and
  - a base having a recess;
- a force transmitting trigger coupled to said recess in the base so as to force the cutting-pushing element to move forward and backward wherein forcing a movement of the force transmitting trigger inserts the push plate into said container while moving the movable cap so as to outwardly push the viscous material through the nozzle and to force the blade to lengthwise cut the container, while releasing the force transmitting trigger allows the cutting-pushing element and the container to move backwards; and
- a stabilizer positioned between the blade and the push plate to assist in a stable backward movement of the container within the housing.

2. The device for dispensing viscous material of claim 1, wherein said stabilizer has a fork-like shape.

3. The device for dispensing viscous material of claim 2, wherein said stabilizer is placed in a position in which the blade is between sides of the fork-like shape.

4. The device for dispensing viscous material of claim 1, wherein the blade is provided with an adjunct and wherein the blade and the adjunct are mounted on the base.

5. The device for dispensing viscous material of claim 4, wherein said adjunct is provided with a coarse surface adjacent to the base and configured to assist in stabilizing the container during movements of the container within the housing.

6. The device for dispensing viscous material of claim 1, wherein the force transmitting trigger is provided with a protrusion that is configured to associate with the recess.

7. The device for dispensing viscous material of claim 1, wherein the sharp edge of the blade is straight.

8. The device for dispensing viscous material of claim 1, wherein the force transmitting trigger is electrically operated and controlled.

9. An improvement to a device for dispensing viscous material having a housing configured to accommodate a container having a nozzle, the container provided with material to be dispensed, a cutting-pushing element provided within the housing, the cutting-pushing element comprises a push plate, a blade having a sharp edge, and a base having a recess, and a force transmitting trigger coupled to the recess in the base so as to force the cutting-pushing element to move forward and backward, the improvement comprising a stabilizer positioned between the blade and the push plate to assist in a stable backward movement of the container within the housing.

10. The improvement to the device of claim 9, wherein the stabilizer is shaped as a fork and wherein sharp edge of the blade is between the two sides of the fork-like structure.

11. The improvement to the device of claim 9, wherein the improvement further comprising providing a coarse surface on an adjunct to the blade, wherein the coarse surface is adjacent to the base so as to assist in stabilizing the container during its movements within the housing.

12. A device for dispensing viscous material out of a container, the container comprising a nozzle and a movable cap, the viscous material being disposed therebetween, the device comprising:

a housing configured to accommodate the container provided with material to be dispensed;

a cutting-pushing element provided within the housing, the cutting-pushing element comprising:

a push plate;

a blade having a rounded sharp edge, and a base having a recess;

a force transmitting trigger coupled to said recess in the base so as to force the cutting-pushing element to move forward and backward wherein forcing a movement of the force transmitting trigger inserts the push plate into said container while moving the movable cap so as to outwardly push the viscous material through the nozzle and to force the blade to lengthwise cut the container, while releasing the force transmitting trigger allows the cutting-pushing element and the container to move backwards; and a stabilizer positioned beneath the blade to assist in a stable backward movement of the container within the housing.

13. The device for dispensing viscous material of claim 12, wherein the blade has a ring-like structure.

14. The device for dispensing viscous material of claim 13, wherein the ring-like structure is supported on an adjunct.

15. The device for dispensing viscous material of claim 14, wherein said adjunct is provided with a line of protrusions that forms a coarse surface configured to assist in stabilizing the container during its movements within the housing.

* * * * *